Oct. 13, 1936.　　　　E. BOECKING　　　　2,057,553

TENSIONING DEVICE FOR ELIMINATING SLACK IN FILMS

Filed March 8, 1934　　　3 Sheets-Sheet 1

INVENTOR
Ewald Boecking
BY
ATTORNEY

Oct. 13, 1936.  E. BOECKING  2,057,553
TENSIONING DEVICE FOR ELIMINATING SLACK IN FILMS
Filed March 8, 1934   3 Sheets-Sheet 2

INVENTOR
Ewold Boecking
BY
ATTORNEY

Oct. 13, 1936.   E. BOECKING   2,057,553
TENSIONING DEVICE FOR ELIMINATING SLACK IN FILMS
Filed March 8, 1934   3 Sheets-Sheet 3

INVENTOR
Ewald Boecking
BY
ATTORNEY

Patented Oct. 13, 1936

2,057,553

UNITED STATES PATENT OFFICE 2,057,553

TENSIONING DEVICE FOR ELIMINATING SLACK IN FILMS

Ewald Boecking, Brooklyn, N. Y., assignor to International Projector Corporation, New York, N. Y., a corporation of Delaware Application March 8, 1934, Serial No. 714,572

10 Claims. (Cl. 88—17)

This invention relates to tensioning devices for eliminating slack from films, and more particularly relates to devices of this character adapted for use in motion picture projecting machines, although they may be employed in other situations, such as in cameras or other machines where it is important that a film be held flat and/or drawn taut while passing a definite point.

Since the invention has been developed and is especially advantageous in motion picture projecting machines it will be described in connection with such a machine, but it is to be understood that the features of the invention may be otherwise employed to produce similar beneficial results elsewhere, and particularly in machines which handle or process or operate on motion picture film.

In the projection of motion pictures, the film is periodically stopped as each individual picture or exposure on the film comes into the zone in which light strikes the film and that picture is projected onto the screen, after which the film is moved forward by intermittent mechanism until the next view is in position for projection. The film in the projection zone should lie flat so that the picture is properly projected, and it has been the practice to apply positive pressure to the edges of the film by means of spring-pressed presser feet, in order to hold it flat. When the film, which has been heated by the intense light falling thereon in the projection zone, is started again, the heat-softened emulsion, which covers one side of film, tends to collect on the presser feet and gum up the latter, with the result that the film often jams and breaks. Even if the film does not break, it is necessary to clean the feet frequently and this is troublesome and annoying.

A primary feature of the present invention resides in providing a construction in which the film is tensioned and maintained flat in the projection zone and in which, at the same time, the foregoing disadvantages are obviated.

A more specific feature is the provision of a construction of this character in which the film passes through a gate in which the film is not contacted at opposite sides at the same point at the same time.

A further feature of this invention is to provide a novel gate for a motion picture projection machine wherein there are no moving parts.

Another feature resides in means for applying to the film just in advance of the gate a substantially uniform and constant tension, in order to obviate slack in the projection zone. Such slack is especially apt to result where, as is customary, the film is supplied continuously from a take-off or feed reel, and pulled forward intermittently.

Another feature resides in the provision of a gate of the character indicated which is adapted to act as fire trap in the event the film should catch fire.

Other objects, features and advantages of the present invention will be in part pointed out and in part become apparent in connection with the following detailed description of certain illustrative embodiments, reference being had to the accompanying drawings wherein.

Figure 1:
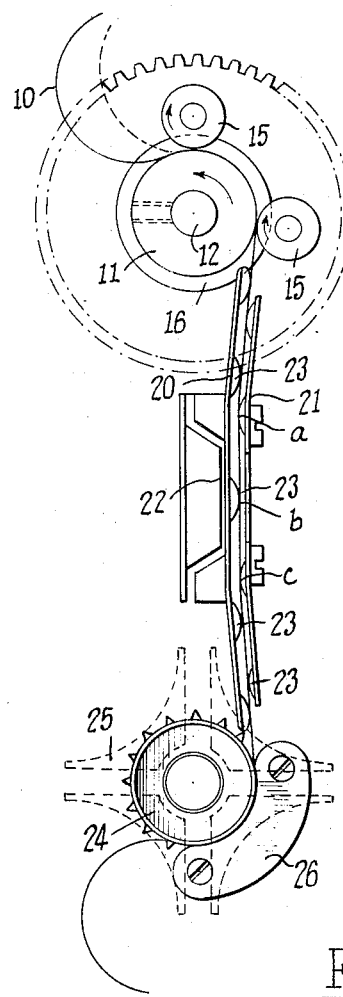
Fig. 1 is a side elevation of a portion of a motion picture projector embodying features in accordance with the invention.
Figure 2:
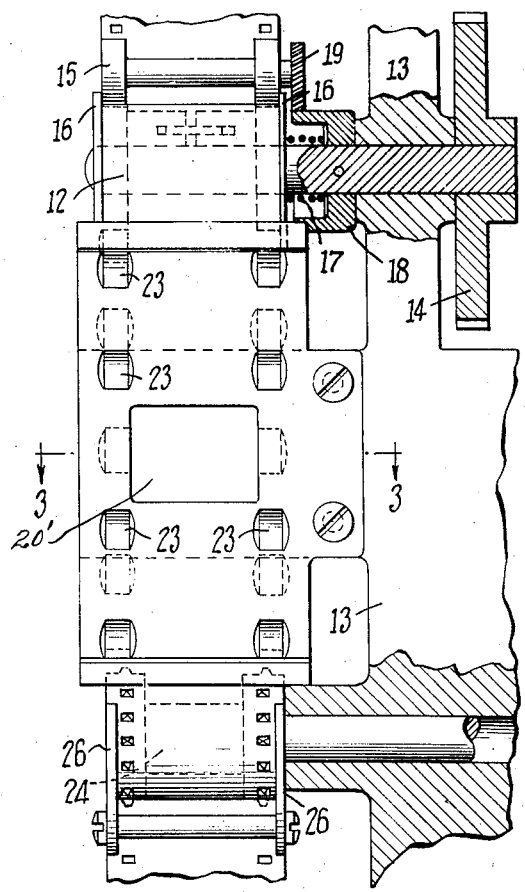
Fig. 2 is a front elevation, partly in section and partly broken away, of the construction shown in Fig. 1.
Figure 4:
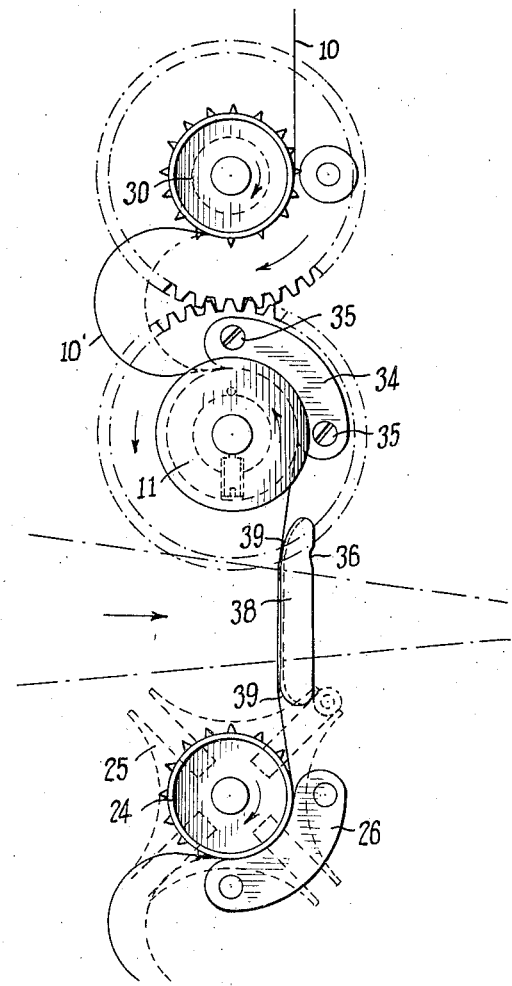
Figure 5:
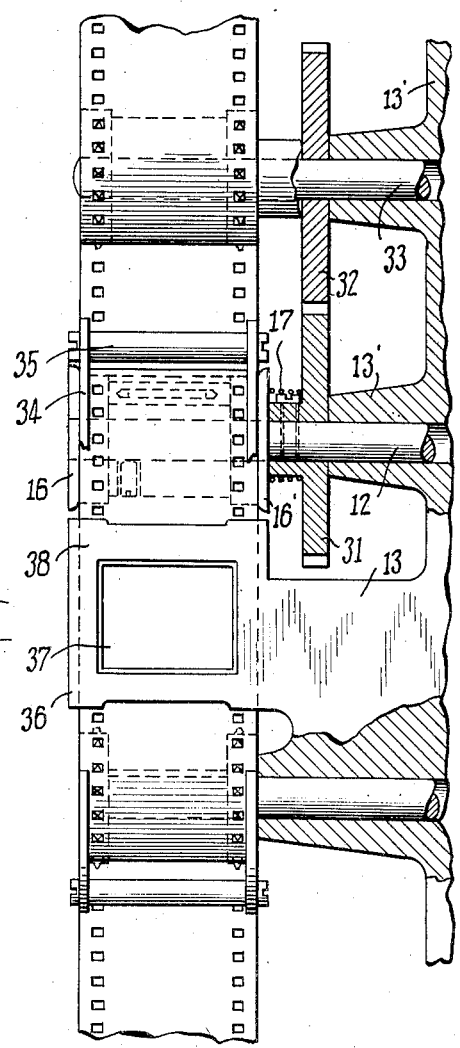
Figure 6:
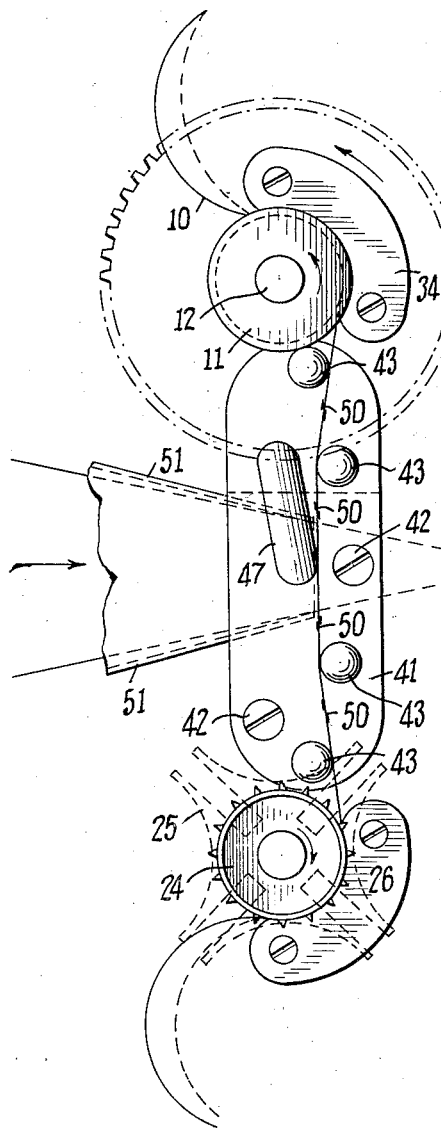
Figure 7:
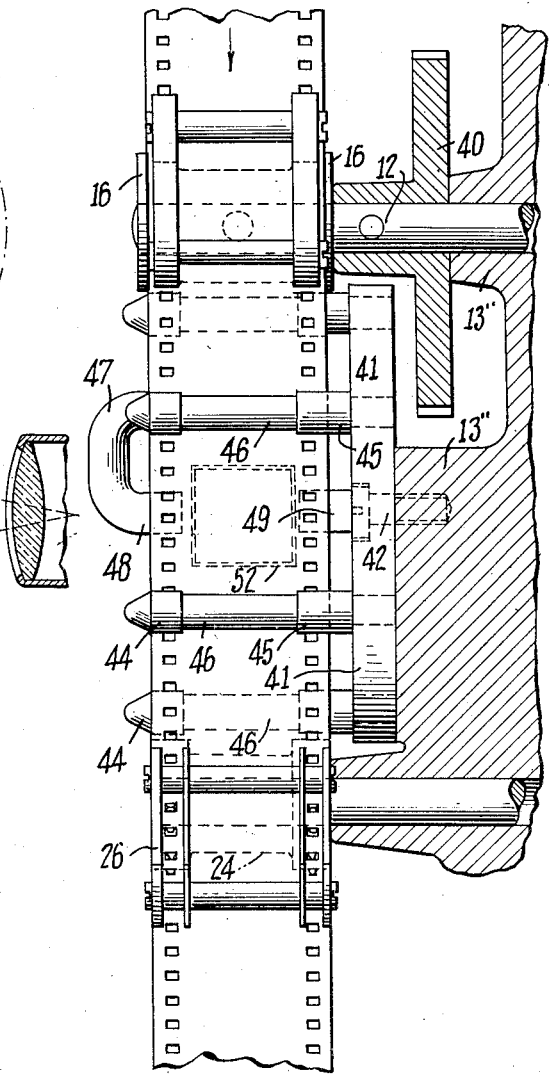

Figs. 4 and 5 are views similar to Figs. 1 and 2, respectively, but showing a modified form of construction, also in accordance with the invention; and Figs. 6 and 7 are views also similar to Figs. 1 and 2, respectively, but showing still another form of construction in accordance with the invention.

Like reference characters designate like parts in the several figures.

Figure 3:
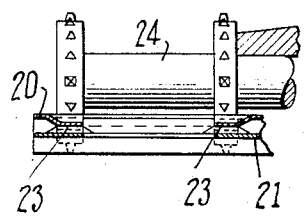
Fig. 3 is section taken on the line 3—3 of Fig. 2, looking down.

Referring first to Figs. 1, 2, and 3 a film 10, supplied in any convenient manner, usually continuously, forms a loop and then passes into contact with a roller 11, which is secured to a shaft 12. The shaft 12 is mounted in rigid frame 13 of the machine and is driven from any suitable source of power (not shown) through a gear 14, in the direction of the arrow in Fig. 1, or in other words, in the reverse direction to that in which the film travels. The film overlies a substantial portion of the surface of roller 11 and may be maintained thereagainst by means of pad rollers 15 (the lower of which has been omitted from Fig. 2).

The film engages the roller only at its side edges, the roller being undercut to avoid contact with the emulsion coated section of the film.

At the ends of roller 11 there are preferably provided discs 16, 16' for edge guiding the film and properly aligning it. The left hand disc 16 may be formed as a flange on the roller 11 and the right hand disc 16' may be formed as a separate member and be urged against the end of roller 11 by a coil spring 17 which bears against a side face of a gear 18 pinned to shaft 12. The gear 18 serves to drive a gear 19 operatively connected to each of the pad rollers 15. In this manner, the rollers 15 may be rotated in the direction of their arrows (Fig. 2) so that their surfaces also move in a direction opposite to the direction in which the film travels.

Provision may be made in any convenient manner for supporting the rollers 15 and for normally urging them against the film lying against roller 11, while permitting them to be withdrawn in order to allow the film to be threaded. Supporting devices for this purpose are known, and any such device may be employed.

Substantially directly below the roller 11 there are mounted opposed, spaced plates 20, 21 between which the film passes and which form the film gate. These plates may be bolted or otherwise secured to any convenient portion of frame 13. They are formed with suitable openings 20' for permitting projection light to pass through them. A suitable aperture plate 22 of any convenient construction may be provided mounted on plate 20, or otherwise supported, for controlling the size of the light beam. However, if desired, the opening in rear plate 20 may be enlarged and the opening in front plate 21 may serve as an aperture, for purposes hereinafter indicated. On each of these plates, adjacent the edges of the film, or in other words outside of the picture area, there are provided spaced knobs or studs 23, which may be formed integral with the plates or as separate elements attached to the plates, in any convenient fashion. Each of these studs is preferably convex or rounded from its upper to lower edge, like the surface of cylinder, or may be spherical, if desired, so that the film will readily slide over it. The studs on plates 20 and 21 are advantageously not directly opposite one another, but rather are staggered vertically, for instance as shown. The bulge and spacing of the studs are preferably such that the portion of the film in the projection zone is maintained practically flat.

While the number of projections or studs employed may vary, it is preferable to have at least three at each margin of the film for guiding it in the projection zone, two being at one surface of the film and one being at the opposite surface of the film, so that there is a three point contact adjacent each margin of the film in this zone, as shown at a, b, and c in Fig. 1. However, the number and arrangement of the studs may vary.

Advantageously, the film portions which are just above and just below the film portion in the projection zone are at an angle to the latter portion, and to this end the plates and studs are preferably constructed so that they are inclined with respect to the plane of the film portion being projected, for instance as shown. This construction assists in maintaining the film taut and flat.

For drawing the film through the gate a suitable sprocket 24 is provided under the control of intermittent mechanism, preferably Geneva gearing of known type, the star wheel of which is shown at 25. A suitable shoe 26 may be employed for maintaining the film in engagement with sprocket 24, and this shoe may be mounted in any convenient or known manner so as to be movable for permitting threading of the film.

Through the construction described, the film is admirably maintained flat in the projection zone without the need for pressing opposite surfaces of the film between members which are positively urged toward each other and against the film. Thus the tendency to scrape emulsion off the film is reduced and for practical purposes substantially eliminated. Moreover, by applying a positive drag to the film in advance of the gate, slack is removed from the film and the tautness and flatness of the film portion in the projection zone is enhanced. The construction of the gate which produces the angular path of the film also assists in producing this result.

Furthermore, as best shown in Fig. 3, the gate acts to a not inconsiderable extent as a baffle to trap the flames, should the film in the projection zone catch fire. Also the reversely rotating rolls will quickly withdraw the film from the beam of light in case of breakage, thus avoiding fires.

Another advantage lies in the provision of the gate without the use of moving parts which have to be separated to permit threading of the film through the gate, and which then have to be returned to operating position. The construction of the machine is thus considerably simplified and at the same time the gate is such that the film may be readily and rapidly threaded by the operator. While this feature has been described as a gate, it may be employed in other situations where useful, for instance in any film handling machine such as a printer or camera.

Turning to Figs. 4 and 5, there is illustrated a somewhat modified form of construction. In this form the film 10 coming from a take-off reel (not shown) may be fed at constant speed, as usual, by a take-off or feed sprocket 30, and after forming a loop 10' preferably passes over roller 11 secured to a shaft 12 mounted for rotation in frame 13' of the machine. The roller 11 is constructed and operates similarly to the corresponding roller in the construction shown in Figs. 1–3, and cooperates with discs 16, 16' for edge guiding the film. A compression spring 17 cooperates with disc 16', as in Figs. 1–3, and bears against a gear 31 secured to shaft 12. The gear 31 serves to drive a gear 32 on shaft 33 of the sprocket 30, and either shaft 12 or shaft 33 may be driven from any suitable mechanism (not shown).

Instead of the rollers 15 shown in Figs. 1–3, there may, if desired, be employed pad shoes 34 mounted on suitable cross-members 35, only the upper of which is shown in Fig. 5, for the sake of clarity of other parts. These shoes may be caused to bear normally against the marginal portions of the film, preferably outside the sprocket holes, by any known device, and are advantageously retractible in order to permit threading of the film through the machine. During operation of the machine, the shoes 34 hold the film against the roller 11.

The film is preferably pulled forward by intermittent mechanism 24, 25, in cooperation with shoe 26, all similar to corresponding mechanism described in connection with Figs. 1–3. Between the roller 11 and sprocket 24 and at one surface of the film, there is provided a plate 36 formed integral with or suitably secured to frame 13', and having an opening 37 for permitting a light beam to pass through it. The plate 36 is preferably constructed and arranged so that it maintains the film portion in the projection zone in a plane spaced from the plane in which this film portion would lie if the plate were removed. Thus the film is caused to take an angular path between the roller 11 and sprocket 24, so that being under tension, it is held flat in the projection zone.

The plate 36 is preferably constructed so that it only engages the margins of the film, for instance to a line adjacent the inner sides of the sprocket holes, and this may be accomplished by bulging or flanging the side portions of the plate as at 38. The rear faces of the bulged portions 38 form flat bearings of sufficient extent to engage a film section containing a single picture over its full height, and are preferably curved as at 39 to permit smooth running of the film.

It will be appreciated that many of the desired advantages of the form shown in Figs. 1-3 are secured by this simplified construction. Moreover, if desired, when the plate 36 is in front of the film, the opening 37 may be formed as an aperture for restricting the light beam to the proper size for projecting the pictures. Thus, the unitary plate 36 may serve as both gate and aperture plate. In this case the added advantage is secured that the rear of the film is flooded with light across its entire width, so that uneven heating of the film is avoided and warping of the film due to uneven heating is avoided. No claim is made herein to this latter feature per se, since it is claimed in my copending application filed of even date herewith, Serial No. 714,570, now Patent No. 2,037,453.

Referring now to Figs. 6 and 7, there is shown a construction in which the film 10 is engaged by a drag roller 11 secured to a shaft 12 which is mounted in frame 13″. The roller 11 may be provided with end flanges 16. The shaft 12 is preferably rotated reversely, similarly to the direction of rotation in the forms previously described, and for this purpose a gear 40 may be secured to shaft 12 and be driven by any convenient mechanism (not shown). Pad shoes 34 of the type shown in Figs. 4 and 5 may be employed for holding the film against roller 11, or rollers such as those shown at 15 in Fig. 1, or other suitable device, may be substituted for the shoes, if desired.

The film is pulled or drawn forward by intermittent mechanism such as is shown at 24, 25, and 26, and described in connection with preceding forms. Between the drag roller 11 and the intermittent sprocket 24, the film passes through the zone in which a beam of light falls on the film for projecting the pictures, and in this zone means of the following character may advantageously be provided for guiding the film and holding it flat and taut.

A bearing member 41, which extends in a vertical plane, may be secured to frame 13″, for instance by means of bolts 42, and in this member there may be mounted a series of pins 43. Each of these pins is preferably provided with enlarged circular portions 44 and 45, adapted to contact the marginal portions of the film, and with reduced central portions 46 which do not touch the central or picture-containing portions of the film. The pins 43 may be mounted rigidly in member 41, or preferably be journalled therein for free rotation. Two of these pins preferably extend parallel to one another and in spaced relation so that one of them lies just above the film section in the projection zone and so that the other of them lies just below this section, at the same surface of the film. The other two of these pins are spaced above and below the projection zone and are adapted to cause the film portions above and below the film portion in the projection zone to assume an angle to the latter portion, and thus, in cooperation with the drag roller and feed sprocket, hold the film portion in the projection zone flat and taut.

The desired flatness of the film section in the projection zone may be enhanced by providing means for engaging the opposite side of the film at a point intermediate the points at which the two central pins engage the film. For example, a hook-shaped pin 47, having an end portion 48, may be mounted in member 41 so that its end portion 48 engages one margin of the film, and a pin 49 may be also mounted in member 41 so that it is aligned with end 48 and engages the other margin of the film. The pin 47, aside from its end 48 lies clear of the light which strikes the picture in the projection zone.

The several pins are preferably so arranged that when the film is stopped any splices 50 in it will be spaced from the pins. In this manner the desired flatness of the film is promoted since there is no interference between the splices and the pins. It will be appreciated that the knobs 23 in Figs. 1-3 may be similarly arranged.

Rearward of the film section in the projection zone there may be provided suitable light confining means such as a housing 51, which may take the form of a frustrum of pyramid. If desired, the forward end of this housing may constitute an aperture plate, as shown in dotted lines in Fig. 7. However, the aperture plate may be positioned in front of the film, and the pins 43, 48, and 49 may be constructed and arranged to lie on respectively opposite sides of the film from their positions shown, so that the advantages of having the light beam flood the film across its entire width are secured, as disclosed in the copending application referred to above. In this case, the forward end of housing 51 will be suitably enlarged.

By virtue of the present invention there is provided a simple and inexpensive construction in which the film is maintained flat in the projection zone without the disadvantages heretofore encountered due to emulsion gumming up the presser feet. Moreover, the film runs easily and freely through the machine and a minimum number of moving parts may be employed; at some points all moving parts have been eliminated. At the same time, any tendency of the film to form slack in the projection zone is overcome. In addition, the present construction is admirably adapted to employment in constructions in which a film section is to be flooded with light over substantially its entire area, with the additional advantage of preventing buckling, due to uneven heating of the film, as covered by my copending application to which reference has been made above.

Still another advantage of the present construction lies in the fact that less power is required as the pressure resistance exerted by the pressure shoes heretofore employed has been eliminated.

The present construction is especially useful and advantageous in connection with intermittent mechanism which periodically stops a film opposite a given point, since the film is constantly maintained under tension and slack is thus avoided.

The terms and expressions which have been employed are used as terms of description and not of limitation, and there is no intention, in the use of such terms and expressions, of excluding any equivalents of the features shown and described, or portions thereof, but it is recognized that various modifications are possible within the scope of the invention claimed.

What is claimed is:

1. In motion picture apparatus in combination, means providing an exposure aperture for a film, means for feeding film past said aperture and holding it at a point beyond the aperture against reverse movement relative thereto, and frictional drag means engaging said film in advance of said aperture for holding it taut against the action of said feeding means, said frictional means having independent movement relative to the surface of the film and consistently in a reverse direction to that in which the film is fed.

2. Apparatus as set forth in claim 1 which further comprises in combination, guide means for holding said taut section of film in bowed disposition whereby it will be held against said guide means at said aperture.

3. Apparatus as set forth in claim 1 which further comprises in combination, guide means for said film at said aperture, said guide means exposing the full width of the film to a source of light whereby strains imposed in the taut section will be equally distributed across the width of the film.

4. Apparatus as set forth in claim 1 which further comprises in combination, guide means for said film at said aperture, said guide means comprising film engaging elements longitudinally staggered on opposite sides of the film.

5. Apparatus as set forth in claim 1 which further comprises in combination, guide means for said film at said aperture, said guide means comprising film engaging elements longitudinally staggered on opposite sides of the film and spaced apart sufficiently to permit the film to pass freely therebetween in a smooth line substantially without gripping action thereon whereby the action of said feeding and drag means may be most effectively realized.

6. In motion picture apparatus, in combination, means providing an exposure aperture for a film, means for feeding film past said aperture and holding it at a point beyond the aperture against reverse movement relative thereto, and a reversely rotating friction roller engaging said film in advance of said aperture for holding it taut against the action of said feeding means.

7. Apparatus as set forth in claim 6 which further includes in combination, means for pressing the film against said friction roller.

8. Apparatus as set forth in claim 6 which further includes in combination, a second reversely rotating roller for pressing the film against said friction roller.

9. A motion picture apparatus in combination, a plate having an exposure aperture therein of a size to give the desired picture on the screen, said plate being rigidly mounted in front of the film in the projection zone, a plurality of pairs of devices for engaging the rear faces of the film adjacent opposite edges thereof at points above and below the aperture, but leaving the film exposed throughout its entire width between said points, means to engage said film at its front surface adjacent both edges thereof at a point substantially midway between the first named points and being free of engagement opposite said first named points, whereby a three-point contact is provided at either edge of the film to guide the same without exerting clamping pressure thereon, means for feeding and holding said film, and means moving in a direction opposite to the direction of movement of the film for engaging the same and exerting a rearward pull thereon to hold the film taut against the action of said feeding means.

10. The combination as set forth in claim 9 which further includes in combination, guiding means for forming bends in the taut section of the film strip immediately above and below the devices for engaging the rear faces of the film.

EWALD BOECKING.